United States Patent
Julve et al.

(10) Patent No.: US 11,516,460 B2
(45) Date of Patent: Nov. 29, 2022

(54) DEVICES, SYSTEMS, AND METHODS FOR IMAGE FRAME CAPTURING AND DETECTING FROZEN IMAGE FRAMES

(71) Applicant: MOTHERSON INNOVATIONS COMPANY LIMITED, London (GB)

(72) Inventors: Javier Julve, Stuttgart (DE); Jean-Sebastien Samson, Stuttgart (DE); Santiago Tonietti, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 303 days.

(21) Appl. No.: 16/597,079

(22) Filed: Oct. 9, 2019

(65) Prior Publication Data

US 2020/0120332 A1 Apr. 16, 2020

(30) Foreign Application Priority Data

Oct. 10, 2018 (DE) .................. 10 2018 125 091.6

(51) Int. Cl.
| | | |
|---|---|---|
| *H04N 17/00* | (2006.01) | |
| *G06T 7/00* | (2017.01) | |
| *H04N 5/265* | (2006.01) | |
| *B60R 11/04* | (2006.01) | |

(52) U.S. Cl.
CPC ......... *H04N 17/002* (2013.01); *G06T 7/0002* (2013.01); *H04N 5/265* (2013.01); *B60R 11/04* (2013.01); *G06T 2207/10016* (2013.01); *G06T 2207/30168* (2013.01)

(58) Field of Classification Search
CPC .... H04N 5/2256; H04N 17/002; H04N 5/265; G06T 7/0002; G06T 7/254; G06T 2207/30252; G06T 2207/30168; G06T 2207/10016; B60R 11/04
See application file for complete search history.

(56) References Cited

U.S. PATENT DOCUMENTS

2015/0271886 A1\* 9/2015 Upton .................. H05B 45/325
315/307
2017/0127036 A1\* 5/2017 You ........................ H04N 5/353

FOREIGN PATENT DOCUMENTS

| DE | 10047896 A1 \* | 4/2002 | .......... H04N 17/002 |
|---|---|---|---|
| DE | 10047896 A1 | 4/2002 | |
| DE | 102013215756 A1 | 2/2015 | |
| DE | 102014213456 A1 \* | 1/2016 | ............. H04N 5/232 |
| DE | 102014213456 A1 | 1/2016 | |
| DE | 102016202620 A1 | 8/2017 | |

OTHER PUBLICATIONS

German Office Action dated Aug. 20, 2019 of application No. DE 10 2018 125 091.6.

\* cited by examiner

*Primary Examiner* — William C Vaughn, Jr.
*Assistant Examiner* — Naod W Belai
(74) *Attorney, Agent, or Firm* — Jones Day

(57) ABSTRACT

A device for image frame capturing, a device for detecting at least one frozen image frame within at least one video stream, a system for providing a frozen image frame detection within at least one video stream, respective methods and vehicle are described.

19 Claims, 4 Drawing Sheets

DEVICES, SYSTEMS, AND METHODS FOR IMAGE FRAME CAPTURING AND DETECTING FROZEN IMAGE FRAMES

CROSS-REFERENCE TO RELATED APPLICATION

This application claims the benefit of foreign priority to German Patent Application No. DE 10 2018 125 091.6, filed Oct. 10, 2018, which is hereby incorporated by reference in its entirety for all purposes.

BACKGROUND

1. Field of the Invention

The present disclosure relates to a device for image frame capturing, a device for detecting at least one frozen image frame within at least one video stream, a system for providing a frozen image frame detection within at least one video stream, respective methods and vehicle.

2. Related Art

In advanced mirror replacement systems it is required to drive the system in a known safety state. Concerning the safety of the vehicle and its passengers a phenomena called "frozen image frame" which is catalogued as a severe hazard is of particular interest. A frozen image frame may occur for example in situations where delays occur along the signal chain from the recording unit to the display unit, respectively, of the mirror replacement system. This may happen due to the presence of buffer memories along the signal chain or other system dependent latencies. In order to avoid hazardous situations in conjunction with outdated image frame information, frozen image frames must be detected in a reliable and fail-safe manner.

There are currently different systems known with respect to detection of normal video operation.

US 2017/0339375 A1 relates to a rear view video system for a vehicle including a display and a rear view camera that generates a raw video signal. A video modification module receives the raw video signal and generates a modified video signal based thereon. A video analysis module analyzes whether the modified video signal is valid or invalid. A switch outputs the modified video signal to the display when the vehicle is in reverse and the modified video signal is valid and outputs the raw video signal to the display when the vehicle is in reverse and the modified video signal is invalid.

US 2016/0039341 A1 relates to a vehicle display displaying a camera video having an indicator. The indicator is static on the display while the camera video is frozen on the display thereby notifying a viewer that the camera video is frozen and the indicator is dynamic on the display while the camera video is live on the display.

The known systems have the drawback that their implementation is difficult and also costly to realize. Furthermore it is quite difficult to automate the detection of frozen image frames in an efficient and reliable manner with these systems. However, having a reliable indication and/or detection of frozen image frames is of high importance. Otherwise dangerous situations where for example a driver reverses without recognizing that the video stream of the rear view camera system is currently being frozen may occur. Then, the driver may hit objects or even more worse hit persons behind the car since the objects or persons are not displayed to the driver due to the frozen image frame phenomena.

SUMMARY

In an aspect, a device for image frame capturing includes at least one image sensor adapted to capture at least one image frame of an overall optical signal illuminating at least one area of the image sensor, whereby the overall optical signal includes at least one first optical signal and at least one second optical signal; and at least one optical pattern signal generator, adapted to generate at least the second optical signal.

In one embodiment, the first optical signal includes, represents and/or is an optical signal of a scene to be captured and/or the second optical signal includes, represents and/or is an optical pattern signal.

In another embodiment, the first optical signal and/or the optical signal of the scene to be captured includes at least (a) light reflected, emitted and/or emanated by at least one object, whereby especially the object is present in the scene, (b) light reflected towards the image sensor, (c) at least partly light of the visible, infrared and/or ultraviolet light spectrum.

In yet another embodiment, the second optical signal and/or the optical pattern signal (i) is dynamic and/or is changing over time, (ii) includes, encodes, represents and/or displays at least one predefined information and/or at least one visual pattern, (iii) includes at least partly light of the visible, infrared and/or ultraviolet light spectrum and/or (iv) changes synchronously with the frame rate of the image sensor. As an example, the second optical signal and/or the optical pattern may include and/or represent at least one roller donut.

In one embodiment, the at least one area of the image sensor includes at least one first area and/or at least one second area, whereby especially the at least one first area of the image sensor is illuminated by the first optical signal, the at least one second area of the image sensor is illuminated by the second optical signal, the at least one first area of the image sensor is adapted to capture at least light of the visible, infrared and/or ultraviolet light spectrum and/or the at least one second area of the image sensor is adapted to capture at least partly light of the visible, infrared and/or ultraviolet light spectrum.

In another embodiment, the first area and the second area are arranged relative to each other such that (i) the first area and the second area partly or entirely overlap, (ii) the first area lays at least partly within the second area of the image sensor, preferably, the first area and the second area have one, two, three or four common edges, (iii) the second area lays at least partly within the first area of the image sensor, preferably, the first area and the second area have one, two, three or four common edges, (iv) the first area lays entirely within the second area of the image sensor, (v) the second area lays entirely within the first area, (vi) the first area and the second area have at least one common edge, and/or (vii) the second area lays, especially completely, outside the first area.

In yet another embodiment, at least one first optical path is defined by the propagation path the first optical signal takes, especially from the scene to be captured and/or towards the image sensor, and/or at least one second optical path is defined by the propagation path the second optical signal takes, especially from the optical pattern signal generator and/or towards the image sensor.

In one embodiment, the device further includes at least one first optical system adapted to (i) project and/or direct the first optical signal onto and/or towards the image sensor, especially onto and/or towards the first area and/or (ii) illuminate the image sensor, especially the first area, with the first optical signal.

In another embodiment, the first optical system is placed in the first optical path and/or is placed between the scene to be captured and the image sensor.

In yet another embodiment, the optical pattern signal generator includes at least one lighting unit for generation, transmission and/or emission of the second optical signal and/or the optical pattern signal, whereby the lighting unit particularly emits light in the visible, infrared and/or ultraviolet light spectrum, at least one monitor, particularly working in the visible, infrared and/or ultraviolet light spectrum. As an example the lighting unit might be a LED or an array of LEDs, where the LEDs may emit light in the same wavelength range or in different wavelength ranges.

In one embodiment, the device and/or the optical pattern signal generator includes at least one second optical system, especially placed in the second optical path, placed optically between the optical pattern signal generator and the image sensor and/or placed inside the optical pattern signal generator.

In another embodiment, the first optical system and/or the second optical system include(s) at least one lens and/or at least one aperture.

In yet another embodiment, the image sensor further includes means adapted to generate at least one video stream signal of consecutive captured image frames.

In one embodiment, the device further includes at least one mirror element, especially placed in the first optical path, placed in the second optical path, placed optically between the optical pattern signal generator and the image sensor, placed optically between the first optical system and the image sensor, placed optically between the scene to be captured and the first optical system, placed optically between the optical pattern signal generator and the second optical system, placed optically between the second optical system and the image sensor and/or placed optically between the scene to be captured and the image sensor.

In yet another embodiment, the mirror element is at least in certain areas designed as a semi-transparent mirror or as a cold light mirror, which are transparent for a special wavelength range and reflective for other spectral ranges, especially (i) the first optical signal and/or the second optical signal is/are passing the mirror element through the transmissive side of the mirror element and/or (ii) the first optical signal and/or the second optical signal is/are reflected at the reflective side of the mirror element.

In one embodiment, the first optical path includes at least one first first optical path and at least one second first optical path, whereby especially the first first optical path extends between on the one hand the first optical system and/or the scene to be captured and on the other hand the mirror element, and/or the second first optical path extends between on the one hand the mirror element and on the other hand the image sensor.

In another embodiment, the second optical path includes at least one first second optical path and at least one second second optical path, whereby especially the first second optical path extends between on the one hand the optical pattern signal generator and/or the second optical system and on the other hand the mirror element, and/or the second second optical path extends between the mirror element and the image sensor.

In yet another embodiment, on the one hand the first first optical path, the second first optical path, the first second optical path and/or the second second optical path and on the other hand the first first optical path, the second first optical path, the first second optical path and/or the second second optical path are extending perpendicular and/or parallel to each other, at least essentially and/or in sections.

In one embodiment, on the one hand the first first optical path and/or the first second optical path and on the other hand the second first optical path and/or the second second optical path are extending along a common straight line, at least essentially and/or in sections.

In another embodiment, the optical pattern signal generator is attached to the image sensor and/or arranged such that it illuminates the image sensor, especially the second area, with the second optical signal, preferably (i) directly, whereby particularly (a) the direction of the second optical path is not changed by one or more optical elements, particularly by mirror elements and/or the mirror element, and/or (b) no one or more optical elements, particularly mirror elements and/or the mirror element, is/are placed in the second optical path and/or optically between the optical pattern signal generator and the image sensor, and/or (ii) indirectly, especially via the mirror element and/or by reflecting the second optical signal at the reflective side of the mirror element.

In another aspect, a device for detecting at least one frozen image frame within at least one video stream, especially a video stream of image frames consecutive captured by a device of the first aspect, includes: At least one receiving unit for receiving the video stream; and At least one image processing unit including: At least one extraction element adapted to extract at least one first image frame from the video stream, to extract at least one first pattern blended within the at least one first image frame, to extract at least one second image frame from the video stream and/or to extract at least one second pattern blended within the at least one second image frame; and at least one comparator element adapted to compare the first pattern extracted from the first image frame with the second pattern extracted from the second image frame, and to identify if a frozen image frame is present, whereby a frozen image frame is identified to be present in case the first pattern being equal to the second pattern and/or in case the first pattern and/or the second pattern is/are not being equal to, respectively, an expected first pattern and/or an expected second pattern.

In one embodiment it is preferred that, the first image frame is a current image frame, the second image frame is a previous image frame, the second image frame is immediate previous to the first image frame in time and/or the second frame and the first frame are separated in time by each other by at least one, preferably by a plurality of intermediate image frame(s) and/or in that the expected first pattern and/or the expected second pattern is/are expected due to knowledge of the pattern dynamics.

In another embodiment, characterized in that the device further includes at least one notification unit, adapted to output a notification signal and/or to manipulate the video stream if the comparator element identifies that a frozen image frame is present, whereby especially manipulating the video stream includes blending within at least one frame of the video stream at least one driver information perceptible to the human observer of the video stream, preferably on at least one display device, whereby the notification signal and/or the driver information includes, encodes, represents and/or displays at least one information regarding the detection of a frozen image frame.

In yet another embodiment, the first pattern and/or the second pattern can be represented, at least in one instance of time, by an optical signal, especially the second optical signal and/or an optical signal generated by an optical pattern signal generator, preferably the optical pattern signal generator included by the device of the first aspect.

In an additional aspect, a system for providing a frozen image frame detection in at least one video stream, includes: At least one first device, especially including at least one device according to the first aspect, for image frame capturing and generation of the video stream of image frames consecutive captured; At least one second device, especially including at least one device according to the second aspect, for detecting at least one frozen image frames within the video stream; and/or At least one display device for displaying the video stream.

In a further aspect, a method for image frame capturing, especially carried out on a device of the first aspect, includes: Illuminating at least one first area of an image sensor with a first optical signal, whereby preferably the first optical signal includes, represents and/or is an optical signal of a scene to be captured; Generating, especially with an optical pattern signal generator, at least one second optical signal, whereby preferably the second optical signal includes, represents and/or is an optical pattern signal; Illuminating at least one second area of the image sensor with the second optical signal; and Capturing at least one frame of the overall optical signal illuminating at least one area of the image sensor, whereby the overall optical signal includes at least the first optical signal and at least the second optical signal, whereby the area includes at least the first area and at least the second area.

In a further aspect, a method for detecting at least one frozen image frame within at least one video stream, especially a video stream of image frames consecutive captured by a device of the first aspect, carried out on a device of the second aspect and/or the image frames captured by the method of the fourth aspect, includes: Receiving the video stream; Extracting at least one first image frame from the video stream, extracting at least one first pattern included by the at least one first image frame, extracting at least one second image frame from the video stream and/or extracting at least one second pattern included by the at least one second image frame; Comparing the first pattern extracted from the first image frame with the second pattern extracted from the second image frame, and identifying if a frozen image frame is present, whereby a frozen image frame is identified to be present in case the first pattern being equal to the second pattern and/or in case the first pattern and/or the second pattern is/are not being equal to, respectively, an expected first pattern and/or an expected second pattern; and preferably Outputting a notification signal and/or manipulating the video stream if a frozen image frame is identified to be present, whereby especially manipulating the video stream includes blending within at least one frame of the video stream at least one driver information perceptible to the human observer of the video stream, preferably on at least one display device, whereby the notification signal and/or the driver information includes, encodes, represents and/or displays at least one information regarding the detection of a frozen image frame.

In a further aspect, a vehicle including at least one device according to the first aspect for image frame capturing, at least one device according to the second aspect for detecting at least one frozen image frame within a video stream and/or at least one system according to the third aspect for providing a frozen image frame detection within at least one video stream.

It has, thus, been surprisingly found that by blending a first optical signal, e.g. the optical signal of the scene to be captured, with a second optical signal, e.g. the optical pattern signal which preferably changes over time, and, hence, forming an overall optical signal and illuminating at least one area of an image sensor with this overall optical signal, the image frames captured by the image sensor inherently include a pattern, especially visual pattern, according to the second optical pattern signal.

Due to the applied blending mechanism of the two optical signals, the visual pattern is present in the captured image frame right from the beginning. Therefore, delays occurring after capturing the image frames in the subsequent transmission and/or processing of the signal of the subsequent captured image frames affect the captured first and second optical signal in the same way. Thus, the second optical signal, especially in form of a visual pattern included by the captured image frames, provide a reliable indicator for determination of frozen image frames. Especially it is not possible that only the captured first optical signal is affected by delays in the video stream. Thus, there is no danger that false positive (i.e. the pattern does not change although the video stream is properly working) or, even more worse, false negative (i.e. the pattern still changes although the video stream is in a frozen image frame state). At the same time implementation is possible in an easy way while the setup still is quite robust.

In this respect the inventors have further been found that realizing the blending mechanism, i.e. blending of the two optical signals, can be achieved in a plurality of ways. The second optical signal can advantageously be directly or indirectly projected onto the image sensor in order to illuminate it. The best choice can be made dependent on the design requirements of the device.

A detection of frozen image frame can be provided in a very comfortable and reliable way in that a person can observe the visual pattern within the video stream on a display where the video stream is displayed. Once the pattern stops changing the person knows that there is a frozen image frame present. More advantageously, it has been found that an automated detection of frozen image frames can also be implemented in an efficient and reliable manner if the second optical signal, hence the visual pattern present in the captured image frames, changes synchronously with the frame rate of the image sensor. Then, if in two consecutive frames received for displaying on the display the pattern are identical, a frozen frame image is present. If the optical signal is alternatively or in addition also known beforehand, it is furthermore possible to compare the patterns of one or more frames of the video stream with the expected patterns. A frozen image frame can then be identified in case the actual patterns do not correspond to the expected ones and respective alerts can be issued.

In one example, the present disclosure allows to implement in a cost-efficient and simple way a reliable and effective schemes for capturing image frames including a pattern and also for detection of frozen image frames. Thus certainness regarding the actual state of the video stream can be introduced for the purposes of processing and/or displaying the image frames. This in turn enables more reliable algorithms to detect frozen image frames without introducing excessive complexity neither in the implementation nor in the processing algorithms.

As noted, when the second optical signal changes with the frame rate every frame captured has an individual pattern, especially within one period of the pattern. The frame rate is the rate the image sensor captures subsequent image frames.

A first element may be arranged "optically between" a first second element and a second second element when an optical signal propagates via the first element along an optical path from the first second element to the second second element. Thus, a first element can be optically between two second elements although the first element is not between the two second elements in a spatial sense, i.e. the three elements are not arranged sandwich-like.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of describing the present disclosure and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the present disclosure or the appended claims. Further, it should be understood that any one of the features can be used separately or in combination with other features. Other systems, methods, features, and advantages of the present disclosure will be or become apparent to those skilled in the art upon examination of the description. It is intended that all such additional systems, methods, features, and advantages be included within this description, be within the scope of the present disclosure, and be protected by the accompanying claims.

Figure 1:
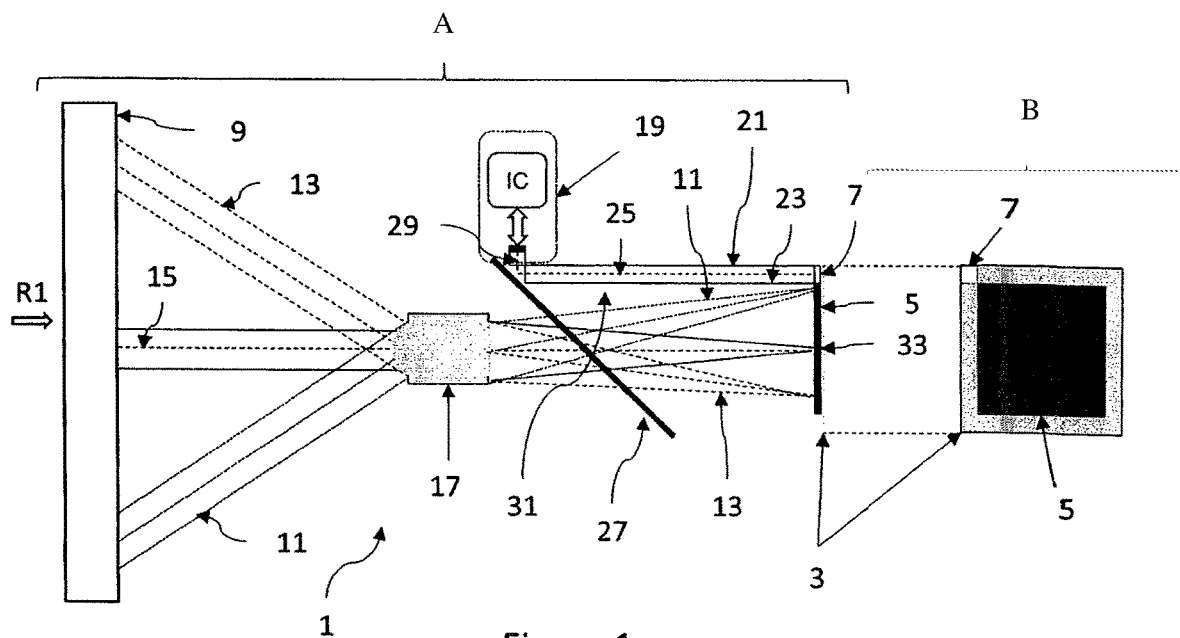
FIG. 1 show a schematic representation of a device for image frame capturing according to a first embodiment.

In part A of FIG. 1, a device 1 for image frame capturing according to a first embodiment is shown. The device 1 includes an image sensor 3. In part B of FIG. 1, the image sensor is shown along the line of sight R1 indicated in part A FIG. 1. Hence, same reference signs refer to the same features in FIG. 1.

The image sensor is adapted to capture at least one image frame of an overall optical signal illuminating at least one area of the image sensor. This area includes a first area 5 and a second area 7. As can be particularly taken from part B of FIG. 1, the first area and the second area are arranged relative to each other such that the first and second areas meet at a single corner of the respective areas. The overall optical signal includes a first optical signal which illuminates the first area 5 and a second optical signal which illuminates the second area 7, respectively, of the image sensor 3.

The first optical signal represents an optical signal of a scene to be captured. In part A of FIG. 1 the scene to be captured includes an object 9. Thus, the first optical signal (which in this case is equivalent to the optical signal of the scene to be captured) includes at least light reflected and/or emitted from the object 9 present in the scene towards the image sensor 3. In part A of FIG. 1, marginal rays 11, 13 emanating from the object 9 are shown for the purpose of illustration of the first optical signal which insofar propagates symmetrically to the optical axis 15 towards the image sensor 3. The device 1 further includes a first optical system 17 adapted to project the first optical signal onto the first area 5 in order to illuminate the first area 5 of the image sensor 3 with the first optical signal.

The second optical signal represents an optical pattern signal which is generated by an optical pattern signal generator 19 included by device 1. The second optical signal (which in this case is equivalent to the optical pattern signal) includes at least partly light of the visible light, infrared or ultraviolet spectrum and represent an optical pattern which is changing over time in a predefined manner. Thus, if at one instance of time the pattern is known, it is known for all other instances of time, too. Particularly, the pattern changes synchronously with the frame rate of the image sensor 3.

In Part A of FIG. 1, two marginal rays 21, 23 emanating from the optical pattern signal generator 19 are shown for the purpose of illustration of the second optical signal which insofar propagates along a second optical axis 25 towards the image sensor 3. The device 1 further includes a mirror element 27 which is placed in the second optical axis 25 optically between the optical pattern signal generator 19 and the image sensor 3. The second optical axis 25 includes a first second optical path 29 and a second second optical path 31. The first second optical path 29 extends between on the one hand the optical pattern signal generator and on the other hand the mirror element 27. The second second optical path 31 extends between the mirror element 27 and the image sensor 3. The mirror element 27 reflects the second optical signal by 90° and towards the image sensor 3 where it illuminates the second area 7 and simultaneously transmits the first optical signal through it towards the image sensor 3. Consequently, the first second optical path 29 and the second second optical path 31 extend perpendicular to each other and the first optical path 15 and the second second optical path 31 extend parallel to each other.

As further shown in part A of FIG. 1, the mirror element 27 is also placed between the first optical system 17 and the image sensor 3. Since the mirror element 27 is here designed as a semi-transparent mirror or a wavelength dependent cold light mirror, which is transparent for a spectral range and reflecting for other spectral ranges, the first optical signal passes the mirror element 27 through the transmissive side of the mirror element 27 and the second optical signal is reflected by the mirror element via the reflective side. In other words, the first optical path is a straight line in contrast to the second optical path.

By virtue of the described setup of device 1, the image frame captured by the image sensor 3 includes both, the scene to be captured (first optical signal) and the visual pattern (second optical signal). The pattern is generated by the optical pattern signal generator 19 and changes following a determinate, thus known, sequence (e.g. a roller donut) synchronously with the frame rate. As will be described later, a frozen image frame in a video stream including subsequent captured image frames can be readily identified using the pattern.

The person skilled in the art, of course, realizes that it would be also possible to rearrange the setup of device 1 and, hence, interchange the course of first and second optical paths. I.e. the first optical signal is reflected by the mirror element 27 and the second optical signal is transmitted through the mirror element 27 along a straight line.

The device of FIG. 1 is insofar based on an optical overlapping mechanism.

Figure 2:
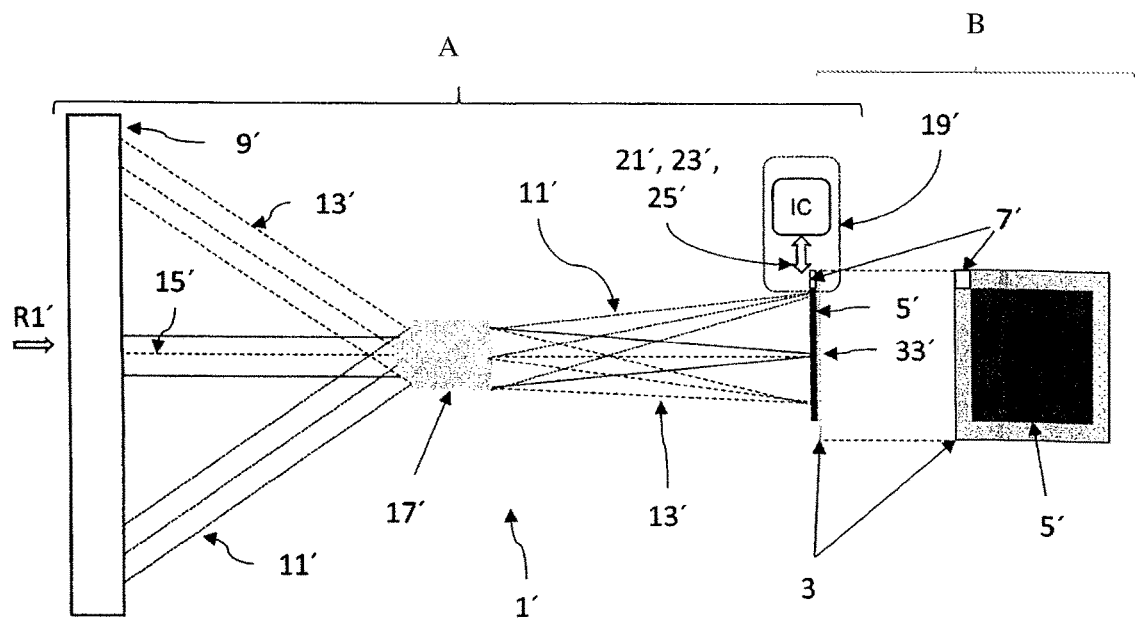
FIG. 2 show a schematic representation of a device for image frame capturing according to a second embodiment.

In part A of FIG. 2, a device 1' for image frame capturing according to a second embodiment is shown. Elements of the second embodiment of the device 1' which functionally correspond as far as possible to those of the first embodiment of the device 1 are provided with the same but dashed reference signs. In part B of FIG. 2, the image sensor 3' is shown along a line of sight R1' indicated in part A of FIG. 2. Since the functionality of the second embodiment of the device 1' largely corresponds to the first embodiment, only differences between the first and second embodiments are discussed below. The explanations given with respect to FIG. 1 also apply for the second embodiment and FIG. 2.

While in device 1 the optical pattern signal generator 19 is arranged such that it illuminates the second area 7 of the image sensor 3 with the second optical signal indirectly via the mirror element 27 in device 1' the optical pattern signal generator 19' is arranged such that it illuminates the second area 7' of the image sensor 3' with the second optical signal directly. Thereby the direction of the second optical path is not changed by one or more mirrors. In other words, the optical pattern signal generator 19' is attached to the image sensor 3' and projecting the second optical signal directly on, hence illuminating, the second area 7'. Consequently, the first optical axis 15' and the second optical axis 25' extend parallel to each other.

The device of FIG. 2 is insofar based on an direct overlapping mechanism.

Figure 3:
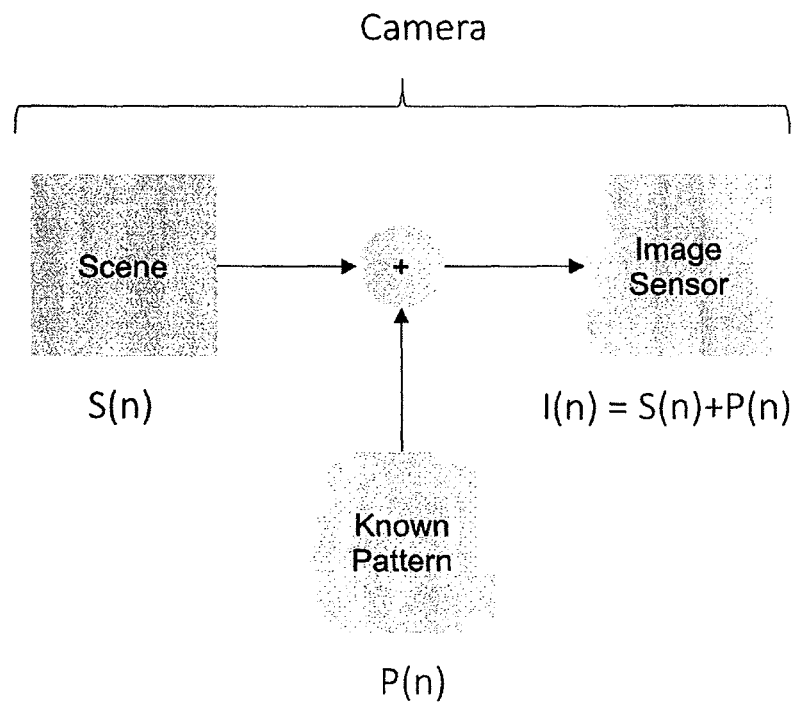
FIG. 3 shows a block diagram of the principle of the blending mechanism according to an embodiment.

FIG. 3 shows a block diagram of the principle of the blending mechanism according to an embodiment inside a device such as device 1 or 1'. The device can be especially a camera. A first optical signal, which is a scene to be captured and denoted in FIG. 3 as S(n), and a second optical signal, which is a known (especially visual) pattern and denoted in FIG. 3 as P(n), are summed (or in other words blended) in order to form an overall signal which is denoted in FIG. 3 as I(n)=S(n)+P(n). This overall signal I(n) in turn is captured by an image sensor, especially the image sensor 3 or the image sensor 3'. The way the first and second optical signals are added or blended may vary and every suitable mechanism might be apply. For example the optical overlapping mechanism as discussed above with respect to FIG. 1 or the direct overlapping mechanism as discussed above with respect to FIG. 2 might be applied.

Since the first optical signal in form of the optical pattern signal is present in the captured image frame right from the beginning, the same delays experienced by the captured first optical signal (i.e. the scene to be captured) are also experienced in a same manner by the captured second optical signal. Thus, by virtue of the setup of the device 1 or 1' a failure of the transmission of the video stream, e.g. due to buffers or other sources of delays, can be readily detected by observing and/or evaluating the optical pattern in the received video stream signal. For example this can be accomplished based on the driver's perception while watching the video stream on a display or the like. The driver can then decide by herself/himself that the image frame is frozen when the driver realizes that the pattern, for example a roller donut, does not change. Of course, in order that this work, the pattern must be overlapped inside the active area of the image sensor 3, 3', i.e. inside the area which is displayed to the driver. For example this can also be accomplished based on image processing such as e.g. software (SW) algorithm. In this case the pattern might also be overlap out of the active area of the image sensor 3, 3', i.e. outside the area which is displayed to the driver. Such an automation of frozen image detection is described next in more detail with reference to FIG. 4.

Figure 4:
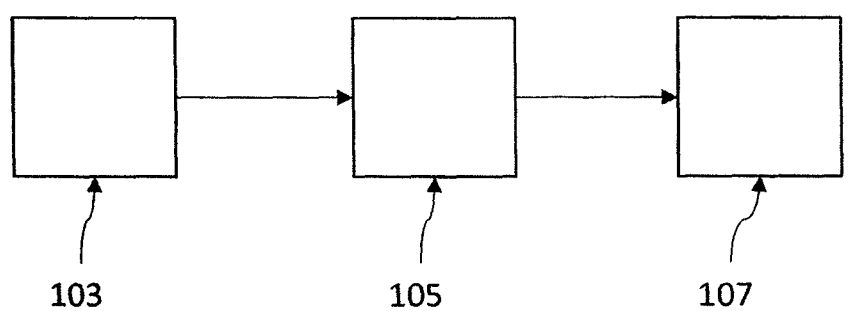
FIG. 4 shows a schematic representation of a device for detecting frozen image frames according to an embodiment.

FIG. 4 shows a schematic representation of a device 101 for detecting at least one frozen image frame within at least one video stream, especially a video stream of image frames consecutive captured by a device such as device 1 or 1', according to an embodiment.

The device 101 includes a receiving unit 103 for receiving the video stream.

The device 101 further includes an image processing unit 105. The image processing unit 105 in turn includes an extraction element (not separately shown in FIG. 4) adapted to extract a first pattern blended within a first image frame of the video stream and to extract a second pattern blended within a second image frame of the video stream. The image processing unit 105 further includes an comparator element (not separately shown in FIG. 4) adapted to compare the first pattern extracted from the first image frame with the second pattern extracted from the second image frame, and to identify if a frozen image frame is present, whereby a frozen image frame is identified to be present in case the first pattern being equal to the second pattern. The image processing unit 105 might be realized as a "system on a chip" (SoC) and/or include an image signal processor (ISP).

Figure 5:
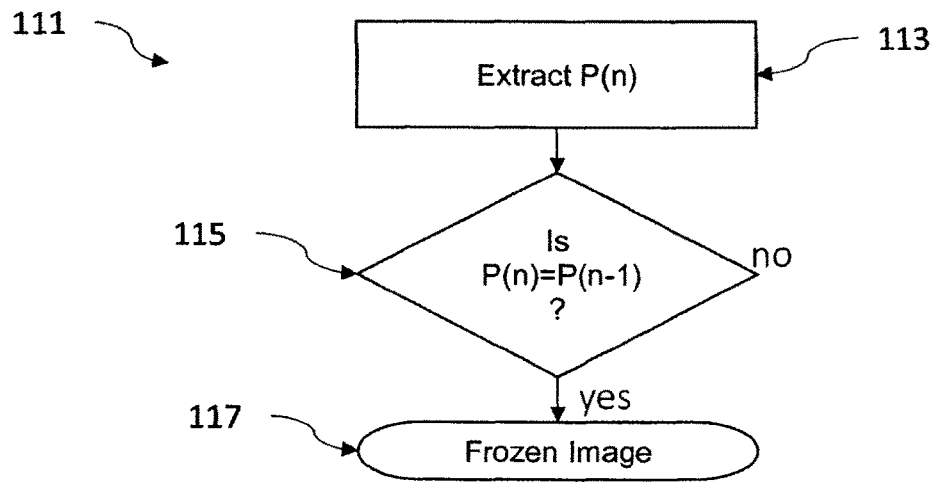
FIG. 5 shows a flow chart diagram of image signal processing according to an embodiment.

FIG. 5 shows a flow chart diagram 111 of image signal processing which can especially be carried out by the image processing unit 105. In a step 113 a first pattern P(n) blended within a first image frame of the video stream is extracted by the extraction element. In a step 115 it is decided whether the first pattern P(n) extracted from the first image frame is equal to the second pattern P(n-1) extracted from the second image frame. The second image frame is an image frame immediate previous to the first image frame in time. If the first and second patterns are equal the comparator element identifies in a step 117 that a frozen image frame is present. This might trigger further actions. Alternatively and/or in addition the next pattern is extracted and compared to the previous one ("no" branch in FIG. 5).

The device 101 shown in FIG. 4 further includes a notification unit 107, adapted to output a notification signal if the comparator element identifies that a frozen image frame is present, whereby the notification signal includes, encodes, represents and/or displays at least one information regarding the detection of a frozen image frame.

Figure 6:
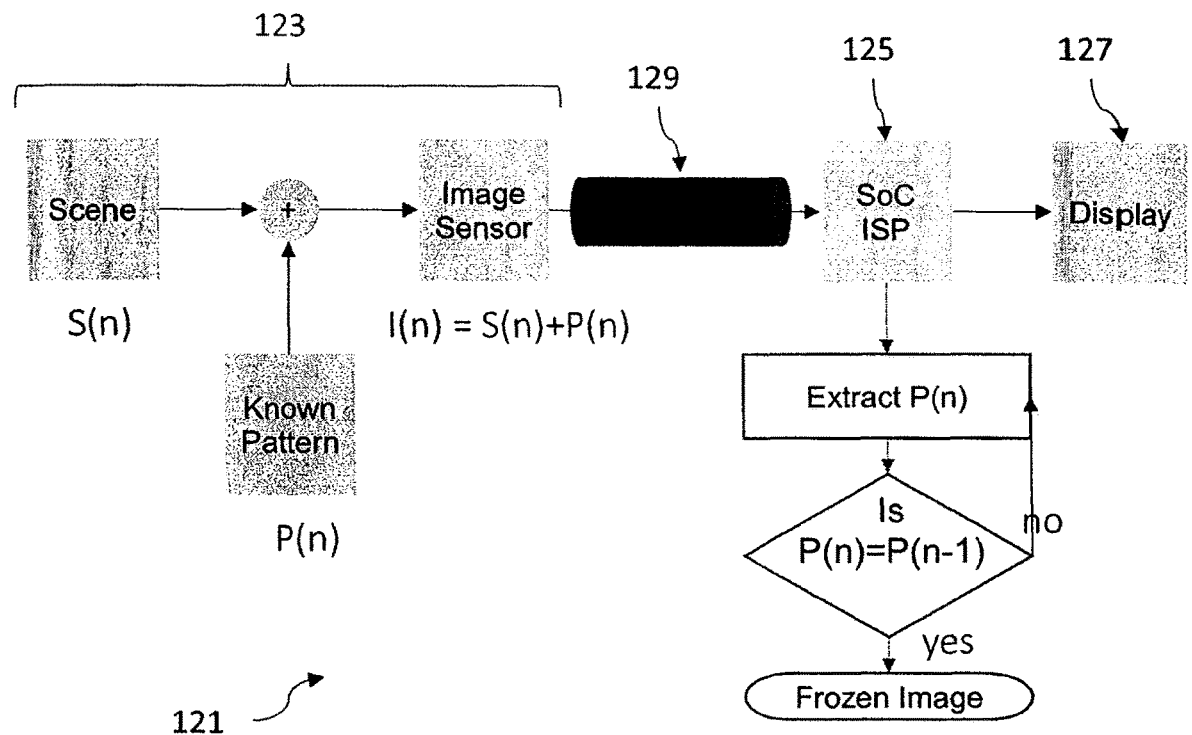
FIG. 6 shows a schematic representation of a system for providing a frozen image frame detection within at least one video stream according to an embodiment.

FIG. 6 shows a schematic representation of a system 121 for providing a frozen image frame detection within at least one video stream according to an embodiment.

The system 121 includes a first device 123, especially a device such as device 1 or 1', for image frame capturing and generation of the video stream of image frames consecutive captured. The system 121 further includes a second device 125, especially a device such as the device 101, for detecting of frozen image frames within the video stream. The system 121 also includes a display device 127 for displaying the video stream, especially to a driver. On the display device 127 either a scene to be captured S(n) alone can be displayed or the scene to be captured S(n) with a blended Pattern P(n) can be displayed, i.e. the image of an overall optical signal I(n)=S(n)+P(n). For the purpose of illustration FIG. 6 also shows a flow chart diagram for identifying frozen images as the one discussed above with respect to FIG. 5. The steps of the flow chart are carried out by the second device 125. However, it is referred to the discussion made above with respect to FIG. 5, which applies here mutatis mutandis, too. Further, the system 121 also includes at least one connection means 129 for transferring the video stream from the first device 123 to the second device 125 and/or the display device 127. The connection means 129 may include at least one cable and/or at least one wireless interface. Since delays of the video stream signal affect the captured overall optical signal, the Pattern P(n) is a reliable reference for frozen image frame detection.

Figure 7:
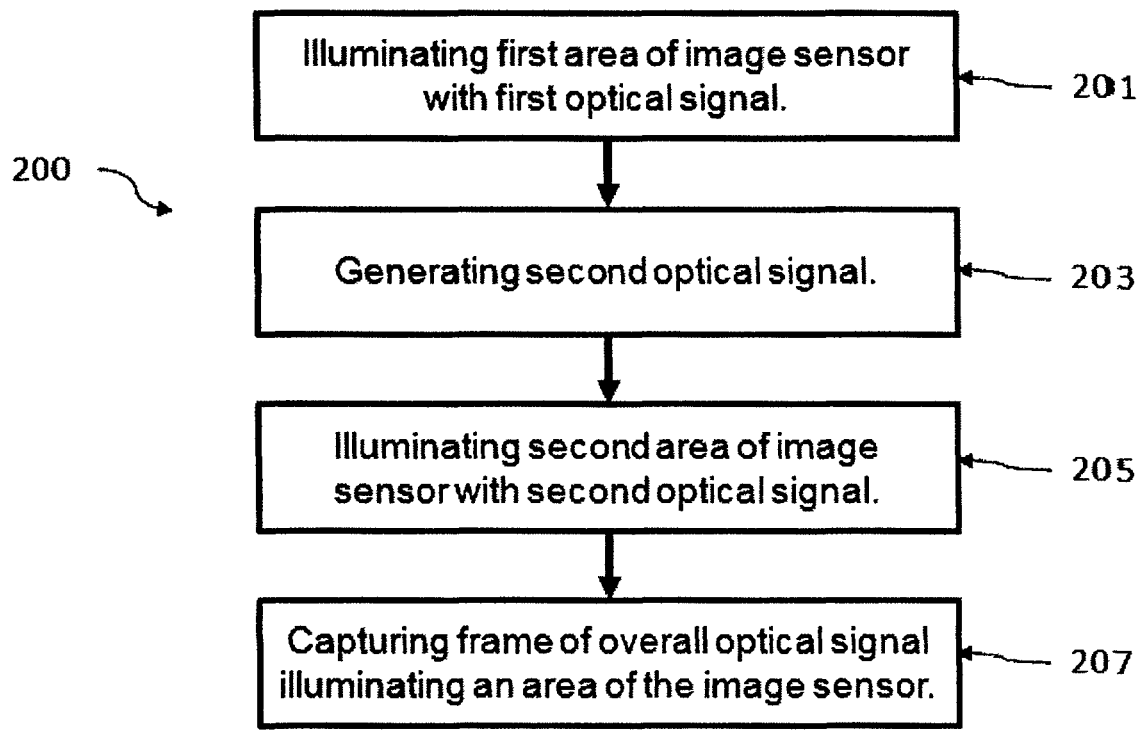
FIG. 7 shows a functional diagram of a method according to an embodiment.

FIG. 7 shows a functional diagram of a method 200 for image frame capturing, especially carried out on a device such as device 1 or 1', according to an embodiment.

In a step 201 at least one first area, especially the first area 5 or 5', of an image sensor, especially the image sensor 3 or 3', is illuminated with a first optical signal, whereby the first optical signal includes, represents and/or is an optical signal of a scene to be captured, especially the object 9'.

In a step 203 at least one second optical signal is generated, whereby the second optical signal includes, represents and/or is an optical pattern signal.

In a step 205 at least one second area, especially the second area 7 or 7', of the image sensor is illuminated with the second optical signal.

Figure 8:
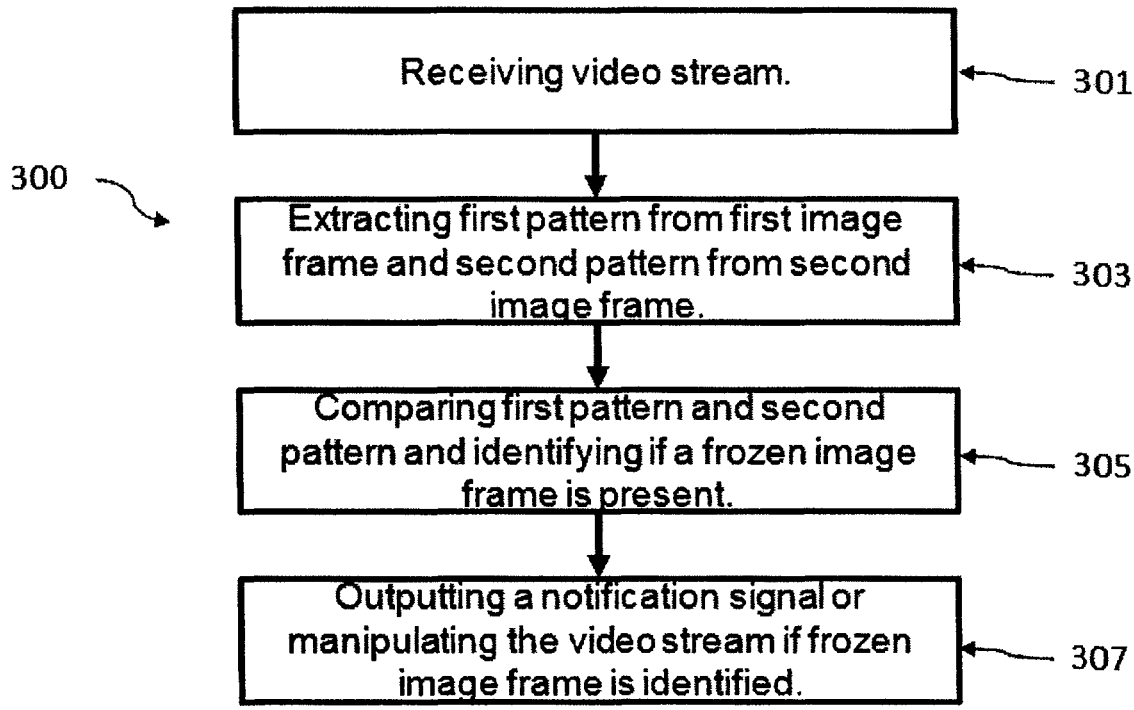
FIG. 8 shows a functional diagram of a method according to an embodiment.

In a step 207 at least one frame of the overall optical signal illuminating at least one area of the image sensor, is captured whereby the overall optical signal includes at least the first optical signal and at least the second optical signal, whereby the area includes at least the first area and at least the second area FIG. 8 shows a functional diagram of a method 300 for detecting at least one frozen image frame within at least one video stream, especially a video stream of image frames consecutive captured by a device such as device 1 or 1', carried out on the device such as device 101 and/or the image frames captured by the method such as the method 200.

In a step 301 the video stream is received.

In a step 303 at least one first pattern included by at least one first image frame and at least one second pattern included by at least one second image frame are extracted.

In a step 305 the first pattern extracted from the first image frame is compared with the second pattern extracted from the second image frame, and it is identified if a frozen image frame is present, whereby a frozen image frame is identified in case the first pattern being equal to the second pattern.

In a step 307 a notification signal is outputted if the comparator element identifies that a frozen image frame is present, whereby the notification signal includes, encodes, represents and/or displays at least one information regarding the detection of a frozen image frame.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

REFERENCE SIGNS

1, 1' Device
3, 3' Image sensor
5, 5' Area
7, 7' Area
9, 9' Object
11, 11' Light ray
13, 13' Light ray
15, 15' Optical axis
17, 17' Optical system
19, 19' Optical pattern signal generator
21, 21' Light ray
23, 23' Light Ray
25, 25' Optical axis
27 Mirror element
29 Optical path
31 Optical path
33, 33' Focal point
101 Device
103 Receiving unit
105 Image processing unit
107 Notification unit
111 Flow chart diagram
113 Step
115 Step
117 Step
121 System
123 Device
125 Device
127 Device
129 Connection means
200 Functional diagram
201 Step
203 Step
205 Step
207 Step
300 Functional diagram
301 Step
303 Step
305 Step
307 Step
R1, R1' Line of sight

What is claimed is:

1. A device for image frame capturing, comprising:
at least one image sensor adapted to capture at least one image frame of an overall optical signal illuminating at least one area of the image sensor, wherein the overall optical signal comprises at least one first optical signal and at least one second optical signal, the at least one first optical signal comprising an optical signal of a scene, and the at least one second optical signal comprising an optical pattern signal; and at least one optical pattern signal generator adapted to generate at least the second optical signal, wherein the at least one area of the image sensor comprises a first area and a second area, wherein the first area is illuminated by the first optical signal and the second area is illuminated by the second optical signal, wherein the first area is adapted to capture light of the visible, infrared or ultraviolet light spectrum, and the second area is adapted to capture at least partly light of the visible, infrared or ultraviolet light spectrum, wherein the second area is completely outside of the first area, and wherein the optical pattern signal (i) is dynamic or changing over time, (ii) comprises, encodes, or displays at least one predefined information or at least one visual pattern, (iii) comprises at least partly light of the visible, infrared or ultraviolet light spectrum, and (iv) changes synchronously with the frame rate of the image sensor.

2. The device of claim 1, wherein the optical signal of the scene comprises at least (a) light reflected, emitted or emanated from at least one object whereby the object is present in the scene, (b) light reflected towards the image sensor, and (c) light of the visible, infrared or ultraviolet light spectrum.

3. The device of claim 1, wherein at least one of
at least one first optical path is defined by the propagation path the first optical signal takes from at least one of the scene to be captured and towards the image sensor, and
at least one second optical path is defined by the propagation path the second optical signal takes from at least one of the optical pattern signal generator and towards the image sensor.

4. The device of claim 1, further comprising at least one first optical system adapted to at least one of (i) project or direct the first optical signal at least one of onto and towards the image sensor and the first area and (ii) illuminate the image sensor with the first optical signal.

5. The device of claim 4, wherein the first optical system is at least one of placed in the first optical path and between the scene to be captured and the image sensor.

6. The device of claim 4, wherein at least one of the first optical system and the second optical system comprises one or more of at least one lens and at least one aperture.

7. The device of claim 1, wherein the optical pattern signal generator comprises
at least one lighting unit for at least one of generation, transmission and emission of the second optical signal or the optical pattern signal, whereby the lighting unit emits light in the visible, infrared or ultraviolet light spectrum, and
at least one monitor working in the visible, infrared or ultraviolet light spectrum.

8. The device of claim 1, wherein at least one of the device and the optical pattern signal generator comprises at least one second optical system which is at least one of placed in the second optical path, placed optically between the optical pattern signal generator and the image sensor, and placed inside the optical pattern signal generator.

9. The device of claim 1, wherein the image sensor further comprises means adapted to generate at least one video stream signal of consecutive captured image frames.

10. The device of claim 1, further comprising at least one mirror element which is at least one of placed in the first optical path, placed in the second optical path, placed optically between the optical pattern signal generator and the image sensor, placed optically between the first optical system and the image sensor, placed optically between the scene to be captured and the first optical system, placed optically between the optical pattern signal generator and the second optical system, placed optically between the second optical system and the image sensor, and placed optically between the scene to be captured and the image sensor.

11. The device of claim 10, wherein the mirror element extends through at least one focal point of at least one of the first and the second optical system, the at least one focal point being located at least one of optically or spatially between the at least one of first and second optical system and the image sensor.

12. The device of claim 10, wherein the mirror element is at least in certain areas designed as a semi-transparent mirror or as a cold light mirror, and at least one of (i) one or more of the first optical signal and the second optical signal is passing the mirror element through the transmissive side of the mirror element, and (ii) one or more of the first optical signal and the second optical signal is reflected at the reflective side of the mirror element.

13. The device of claim 1, wherein the first optical path comprises at least one first first optical path and at least one second first optical path, wherein at least one of
the first first optical path extends between (i) at least one of the first optical system and the scene to be captured, and (ii) the mirror element, and
the second first optical path extends between the mirror element and the image sensor.

14. The device of claim 13, wherein at least one of (i) the first first optical path, (ii) the second first optical path, (iii) the first second optical path, and (iv) the second second optical path, and at least one of (i) the first first optical path, (ii) the second first optical path, (iii) the first second optical path, and (iv) the second second optical path are extending at least one of substantially perpendicular and substantially parallel to each other entirely or partially.

15. The device of claim 13, wherein at least one of the first first optical path and the first second optical path, and at least one of the second first optical path and the second second optical path, are extending substantially along a common straight line entirely or partially.

16. The device of claim 1, wherein the second optical path comprises at least one first second optical path and at least one second second optical path, wherein at least one of
the first second optical path extends between (i) at least one of the optical pattern signal generator and the second optical system and (ii) the mirror element, and
the second second optical path extends between the mirror element and the image sensor.

17. The device of claim 1, wherein the optical pattern signal generator is at least one of attached to the image sensor and arranged so that it illuminates the image sensor and the second area with the second optical signal,
wherein the optical pattern signal illuminates the image sensor and the second area with the second optical signal at least one of:
directly with at least one of (a) the direction of the second optical path being unchanged by one or more optical elements, by mirror elements or the mirror element, and (b) no one or more optical elements, mirror elements or the mirror element is placed in the second optical path or optically between the optical pattern signal generator and the image sensor, and indirectly via at least one of the mirror element and by reflecting the second optical signal at the reflective side of the mirror element.

18. A method for image frame capturing using the image capturing device of claim 1, comprising:

illuminating at least one first area of an image sensor with a first optical signal, wherein the first optical signal at least one of comprises and represents an optical signal of a scene to be captured;

generating with an optical pattern signal generator at least one second optical signal, wherein the second optical signal at least one of comprises and represents an optical pattern signal;

illuminating at least one second area of the image sensor with the second optical signal, wherein the at least one second area is completely outside of the at least one first area; and capturing at least one frame of the overall optical signal illuminating at least one area of the image sensor, wherein the overall optical signal comprises at least the first optical signal and at least the second optical signal, whereby the area comprises at least the first area and at least the second area wherein the optical pattern signal (i) is dynamic or changing over time, (ii) comprises, encodes, or displays at least one predefined information or at least one visual pattern, (iii) comprises at least partly light of the visible, infrared or ultraviolet light spectrum, and (iv) changes synchronously with the frame rate of the image sensor.

19. A vehicle comprising at least one device according to claim 1 for image frame capturing.

* * * * *